(12) United States Patent
St. John-Larkin

(10) Patent No.: US 9,075,807 B2
(45) Date of Patent: Jul. 7, 2015

(54) SYSTEM AND METHOD FOR CREATING, RECEIVING AND USING INTERACTIVE INFORMATION

(75) Inventor: David Christopher St. John-Larkin, Denver, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 2175 days.

(21) Appl. No.: 11/966,735

(22) Filed: Dec. 28, 2007

(65) Prior Publication Data

US 2008/0162406 A1 Jul. 3, 2008

Related U.S. Application Data

(60) Provisional application No. 60/882,897, filed on Dec. 29, 2006.

(51) Int. Cl.
*G06F 7/00* (2006.01)
*G06F 17/30* (2006.01)

(52) U.S. Cl.
CPC .............. *G06F 17/30038* (2013.01)

(58) Field of Classification Search
USPC ........................................... 707/736
See application file for complete search history.

(56) References Cited

U.S. PATENT DOCUMENTS

| 5,481,296 A | 1/1996 | Cragun et al. |
| 5,703,655 A | 12/1997 | Corey et al. |
| 5,999,688 A | 12/1999 | Iggulden et al. |
| 6,038,367 A | 3/2000 | Abecassis |
| 7,319,806 B1* | 1/2008 | Willner et al. ............... 386/248 |
| 2002/0120925 A1* | 8/2002 | Logan ............................. 725/9 |
| 2003/0067554 A1* | 4/2003 | Klarfeld et al. ............... 348/461 |
| 2006/0090186 A1* | 4/2006 | Santangelo et al. ............ 725/87 |

* cited by examiner

*Primary Examiner* — Robert Beausoliel, Jr.
*Assistant Examiner* — Nicholas Allen
(74) *Attorney, Agent, or Firm* — Kilpatrick Townsend & Stockton LLP

(57) ABSTRACT

Systems and methods are provided for implementing and using interactive information. In one embodiment, a user may specify certain information that should be collected by the embodiment. The embodiment may monitor or search through one or more data streams for all information matching or corresponding to the user's specifications.

22 Claims, 3 Drawing Sheets

SYSTEM AND METHOD FOR CREATING, RECEIVING AND USING INTERACTIVE INFORMATION

CROSS-REFERENCE TO RELATED APPLICATION

This application claims benefit under 35 U.S.C. §119(e) to U.S. Provisional Patent Application No. 60/882,897, entitled "System and Method for Creating, Receiving and Using Interactive Information," filed on Dec. 29, 2006, which is hereby incorporated by reference herein in its entirety.

FIELD OF THE INVENTION

The present invention relates generally to the creation, receipt and use of interactive information, and more particularly to the creation, receipt, and use of a personalized information service collecting user-selected information into a single aggregate.

BACKGROUND ART

The proliferation of data has made finding and reviewing data of particular interest to a user potentially difficult. Digital data may take many forms, such as audiovisual programming, computer or other data files, music, and so on. The sheer number of audiovisual programs available to a subscriber of a cable or satellite programming service can be overwhelming. Oftentimes, the audiovisual program includes multiple segments, each of which has different subjects of data. Only some of this data may be of interest to the subscriber/user. As an example, a news program may include a variety of segments, each of which includes data on a different news story. If a subscriber is interested only in the data of a single segment of the news, it may be tedious for the subscriber to review the entire program in order to find the data of interest.

Thus, there is a need for an improved system and method for creating, receiving and using interactive information.

BRIEF SUMMARY OF THE INVENTION

One embodiment of the present invention takes the form of a method for storing a data segment. The method provides for receiving a data stream, the data stream containing at least one data segment. The method further provides for receiving first metadata describing at least one attribute of the data stream and second metadata describing at least one attribute of the data segment. The method also provides for determining if the second metadata matches a search criterion and, in the event that the second metadata does match the search criterion, storing the data segment.

Another embodiment of the present invention takes the form of a method for storing a segment of an audiovisual program. The method provides for receiving metadata describing at least one attribute of the audiovisual program, including at least one attribute of at least one segment of the program. The method further provides receiving a search criterion from a user and determining if the search criterion matches the metadata of the at least one segment of the program. In the event that the search criterion matches the at least one attribute of the segment of the program, the method provides for setting a timer to store the segment when the audiovisual program is received.

Yet another embodiment of the present invention takes the form of a system for storing a segment of an audiovisual program. The system comprises a transmitter, a storage device and a receiver. The receiver is configured to receive metadata describing at least one attribute of the audiovisual program, including at least one attribute of at least one segment of the program. The receiver is further configured to receive a search criterion from a user, receive the audiovisual program from the transmitter, and determine if the search criterion matches the metadata of the at least one segment of the program. In the event that the search criterion matches the at least one attribute of the segment of the program, the receiver sets a timer to store the segment when the audiovisual program is received.

A fourth embodiment of the present invention takes the form of a method for storing a segment of an audiovisual program. The method comprises providing an audiovisual program, the program containing at least one data segment. The method further comprises providing metadata describing at least one attribute of the audiovisual program, including at least one attribute of at least one segment of the program where the metadata is compared to a search criterion provided by a user and, in the event that the metadata matches the search criterion, a timer is set to store the segment of the program when the audiovisual program is sent.

DETAILED DESCRIPTION

One embodiment of the present invention takes the form of an apparatus for implementing and using interactive information. Through the embodiment, a user may specify certain information that may be collected by the embodiment. The embodiment may monitor or search through one or more data streams for all information matching or corresponding to the user's specifications.

Matching information may be stored by the embodiment on a storage device. Upon receiving a trigger, such as a user-initiated command or action, the embodiment may retrieve the stored, matching information and display it to the user or otherwise permit the user to access the information. The embodiment may monitor the display of the stored, matching information and present it according to a variety of presentation schemes. It should be noted that the term "information" encompasses many varieties of digital data, including, but not limited to: audiovisual programs and files; documents; data files; digital satellite broadcasts; digital cable transmissions; and so on.

Figure 1:
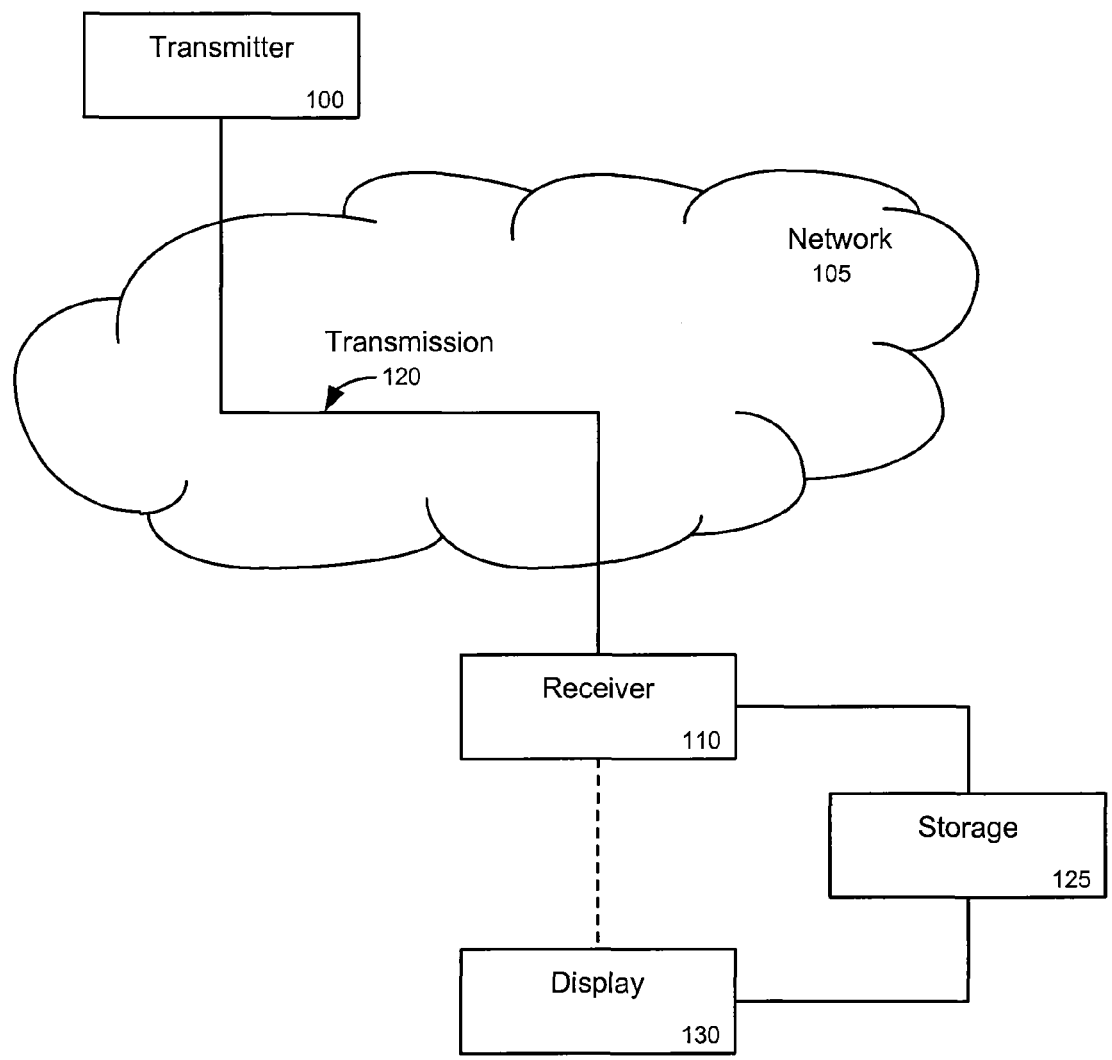
FIG. 1 depicts an exemplary embodiment of the present invention in an exemplary operating environment.

FIG. 1 displays an exemplary embodiment of the present invention and an exemplary operating environment. A transmitter 100 may send a transmission 120 across a network 105 to a receiver 110. The transmission 120 may include information of the type described above. Additionally, it should be noted that "information," as used herein, may refer to a portion or segment of a larger broadcast, program, or file. For example, a news program may have multiple segments, such as local news, weather, sports news, international news, headlines, an introduction, a closing and so forth, each of which may be separately considered information within the scope of this document. The overall news program may also be considered information.

The network 105 may be any network or configuration suitable to carry, pass or facilitate the transmission 120 from the transmitter 100 to the receiver 110. Accordingly, the network 105 may be the Internet, an Ethernet, a wide-area network, a local-area network, a wireless network (including a network employing Bluetooth, infrared, radio frequency, ultra-high frequency, or very high frequency transmissions, each alone or in combination with another wireless transmission type) a wired network, a telephone system, and so forth. Likewise the transmitter 100 may be any device or entity configured to send information across the network 105 to at least one receiver 110. Exemplary transmitters include: a satellite system; cable headend; a server, router or other computing device; a mobile device such as a mobile telephone, handheld computing device, personal digital assistant and so forth; a digital radio studio, tower or other broadcasting device; and so on. Similarly, the receiver 110 may be any device or entity capable of, configured to, or otherwise able to receive the transmission 120. Exemplary receivers include a set-top box; a digital video recorder (which may be collocated or integrated with a set-top box); a television; a radio or stereo; a personal computer; a mobile device such as a mobile telephone, handheld computing device, personal digital assistant and so forth; and so on.

The receiver 110 may be operably connected to a display 130 and is typically connected to a storage device 125. Likewise, the storage device 125 may be connected to the display 130. The embodiment may display received or stored information via the display 130. It should be noted that any of the receiver 110, storage device 125 and display 130 may be integrated into a single unit. For example, if the receiver 110 is a satellite transmission receiver and the storage device 125 is a digital video recorder, the two may be integrated into a single set-top box.

Henceforth, the exemplary embodiment will be discussed in terms of a digital satellite transmission 120 originating from a satellite transmitter 100 and received at a set-top box, digital video recorder, or other suitable receiver 110. It should be understood that such a transmitter 100, network 105 and receiver 110 are exemplary and the teachings disclosed herein may be applied to any of the foregoing transmitters, network and/or receivers.

The transmitter (e.g., satellite) 100 may send a transmission 120 to the set-top box/receiver 110. The transmission 120 may include one or more programs multiplexed on a single transponder channel. The use of transponder channels for satellite transmissions, multiplexing of programs and receipt of satellite transmissions are generally known to those of ordinary skill in the art and accordingly will not be described further herein. The information in such a transmission generally takes the form of one or more audiovisual (or simply audio or visual) segments, such as a television program, portion of a television program, movie or portion thereof, commercial, special event and so forth. Each separate unit of information may be thought of as a segment of the overall transmission and will be so referred to herein.

Each segment may include metadata therein, or metadata may be otherwise associated with each segment. For example, metadata may be broadcast by the satellite 100 on a separate transponder channel from the transponder channel carrying the associated segment(s). In such a case, the receiver 110 may utilize a second tuner configured to monitor the separate transponder channel. The second transponder channel may broadcast metadata only or may broadcast both segments and metadata. Further, the receiver 110 may switch to the separate transponder channel when the first transponder channel is no longer in use. Metadata alternatively may be attached to, or embedded in, a segment by a segment provider supplying the segment to the satellite or by the satellite itself. As an example, program information for a television show broadcast by a satellite content provider may be included with the television show as metadata. Generally, metadata relates to the nature of the segment and provides additional knowledge regarding the segment. For example, if the segment is a television program, metadata may include: ratings such as G, PG, PG-13, R, NC-17; certain keywords such as, e.g., "violence," "nudity," "language;" a person's name (such as an actor or director); category denominator (e.g., "comedy," "drama," "cartoon"); topic of the segment (news, sports, a sporting team's name, gossip, etc.); and so forth.

As mentioned above, metadata may be broadcast with a segment or separately from an associated segment. Metadata may be periodically broadcast on one or more transponder channels, for example ("carousel metadata"). In one exemplary embodiment, carousel metadata is broadcast by the transmitter 100 every 30 seconds. For metadata broadcast separately from the associated segment, the receiver 110 may utilize multiple transponder channels to collect the carousel metadata. Thus, as a segment is received, carousel metadata may periodically provide additional information relating to that segment. Alternatively, metadata may be broadcast in advance of its corresponding segment. By broadcasting metadata in advance, it may be possible to include more information in the metadata ("extended metadata"). Extended metadata may be received by the receiver 110 and stored on a storage device 125 for later optional retrieval and presentation. Extended metadata may be broadcast on a dedicated metadata transponder channel or in a carousel fashion. Since extended metadata is generally received before its associated segment is transmitted across the network 105, a user may review extended metadata to determine certain information about segments scheduled for inclusion in an upcoming transmission 110.

A user may select one or more keywords or other search criteria and provide them to the embodiment. The embodiment may then review all metadata (of any type received at the receiver 110) to determine if any such metadata matches the user's search criteria. Segments associated with metadata matching the search criteria may be stored on the storage device 125 once received by the receiver 110. The embodiment may implement a search function ("searcher") to analyze metadata as it is received, either with or prior to receipt of an associated segment, determine which metadata matches the search criteria and thus determine which segments will be stored on the storage device 125 by the embodiment. In one embodiment, the search function may first accept and store the search criteria provided by the user. The searcher may then receive the incoming metadata describing various attributes of the segments being broadcast by the transmitter 100. The searcher may then compare the keywords or other search criteria against the incoming metadata in search of a match between the keyword and the segment attributes. If a match is found, the searcher may then instruct the storage device 125 to store the desired segment. A further embodiment may provide a search function to continually analyze incoming metadata on the second transponder channel. If a match between the metadata and the search criteria is found, the embodiment may tune the receiver 110 to receive the desired segment and begin storing the segment in the storage device 125.

As mentioned above, individual portions of a program may be considered segments. In an embodiment operative with segments defining portions of a program, metadata may change relatively quickly or new metadata may be received relatively quickly. For example, presume "Late Night With David Letterman" has four guest appearances, an opening monologue, a musical performance, and a closing. "Late Night" may thus have seven distinct segments, each with different metadata. If the metadata is broadcasted attached to or concurrently with each segment, the receiver will obtain new metadata each time a new segment begins. Continuing the example, some metadata may remain the same (such as the name of the television program) while other metadata changes (such as the name of each guest). In the present embodiment, the receiver 110 and storage device 125 may capture and store only the individual segments matching the user's specified search criteria. Thus, if a particular actress were a guest on "Late Night With David Letterman" in the present example, the embodiment may record only the segment in which she appears (or associated with metadata including her name) and not record the remainder of the television program.

The embodiment may determine the beginning and end of each segment, and thus when to begin and terminate storing of a segment, in a number of ways. For example, metadata received prior to the transmission of a segment may include the start and stop times of the segment in order to initiate and terminate segment recording. Alternatively, the embodiment may begin recording of a segment when associated metadata matching the search criteria is received and terminate recording of the segment when new metadata, no longer matching the search criteria, is received. Such new metadata may indicate the beginning of a new segment. This particular implementation may be used when metadata is broadcast concurrently with, or at the beginning of, an associated segment. Alternatively, the embodiment may monitor carousel metadata being transmitted on multiple transponder channels and begin recording of the segment when the metadata matches the search criteria. As still another option, each segment may include a "start" and "stop" marker indicating when recording should begin and terminate.

Still another embodiment of the invention may operate generally as described above but not rely on metadata to initiate storage of a segment. Instead, the embodiment may include a form of either text recognition or audio recognition. For example, the embodiment may be equipped with optical character recognition (OCR) or speech recognition capabilities. When text (in the case of an OCR-equipped embodiment) or speech (in the case of a speech recognition-equipped embodiment) appears or is spoken in a program and that text or speech matches the user's search criteria, recording may begin.

In such an embodiment, recording may terminate when one or more conditions are satisfied. For example, recording of the segment may stop after a certain period of time. Recording may terminate when the embodiment receives metadata not matching metadata present during the segment, or metadata indicating the beginning of a new segment. Recording may terminate when the segment is scheduled to end, and so on.

It should be noted that references to "recording" a segment, as used herein, are intended to encompass any method of obtaining and storing a segment. Thus, downloading of a segment is one example of recording, as is storage of a segment as the segment is broadcast/received.

The embodiment may also display the stored segments. Generally, in response to a user-initiated action, the embodiment may retrieve one or more stored segments from the storage device 125 and display them on the display 130 (such as a television or computer monitor). The user may signal in a variety of manners to the embodiment that playback of stored segments is to begin. For example, the user may use a remote control to instruct the embodiment to show stored segments. Alternatively, the user may access a particular dedicated channel to initiate playback. As an example, where the receiver 110 is a set-top box or portion thereof, the user may tune the set-top box to a unique satellite channel. The set-top box, upon being tuned to the particular channel, may automatically begin playing back segments from the storage device 125. In this manner, the user may be provided with a unique, customized channel showing only those segments in which the user has expressed an interest.

It should be noted that certain embodiments of the present invention may utilize search criteria derived from a user's actions, activities, past viewing preferences and so forth instead of user-specified criteria.

Figure 2:
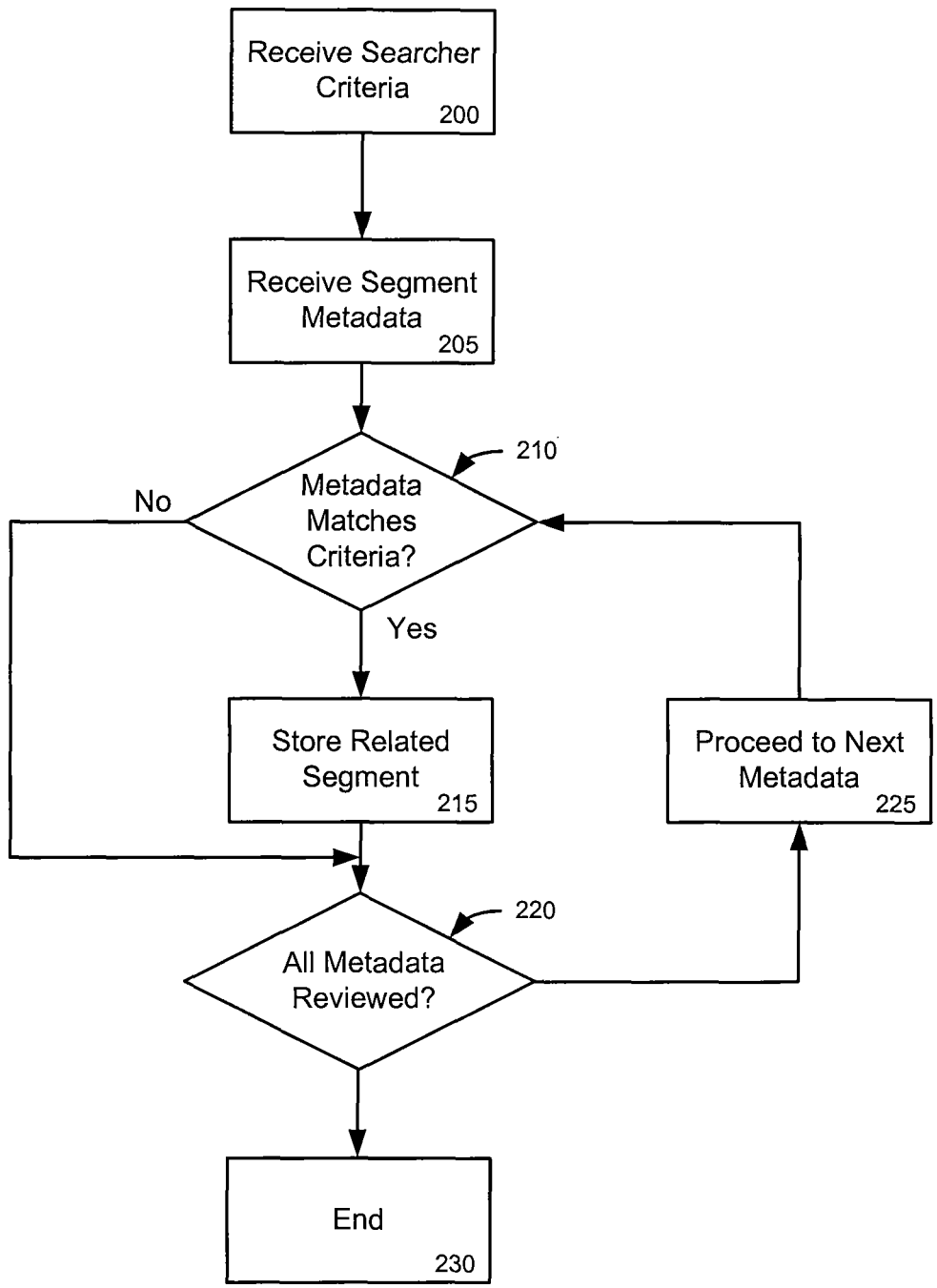
FIG. 2 is a flowchart for receiving and storing interactive information in accordance with the exemplary embodiment of the present invention.

FIG. 2 is a flowchart generally depicting a method for receiving and storing interactive information in accordance with the exemplary embodiment of the present invention. The method begins in operation 200, in which the receiver 110 receives one or more search criteria. In operation 205, the embodiment receives segment metadata in any of the manners described above.

In operation 210, the embodiment determines whether the received metadata matches the search criteria. If not, then the associated segment is not stored and the embodiment accesses operation 220. If, however, the metadata matches, then operation 215 is executed and the related segment is stored on the storage device 125.

In operation 220, the embodiment determines if all metadata received has been analyzed. If no, then in operation 225 the embodiment proceeds to the next metadata and determines if it matches the search criteria in operation 210, effectively repeating a loop for the new metadata. Otherwise, if all metadata received has been reviewed, the embodiment terminates the method in operation 230.

Figure 3:
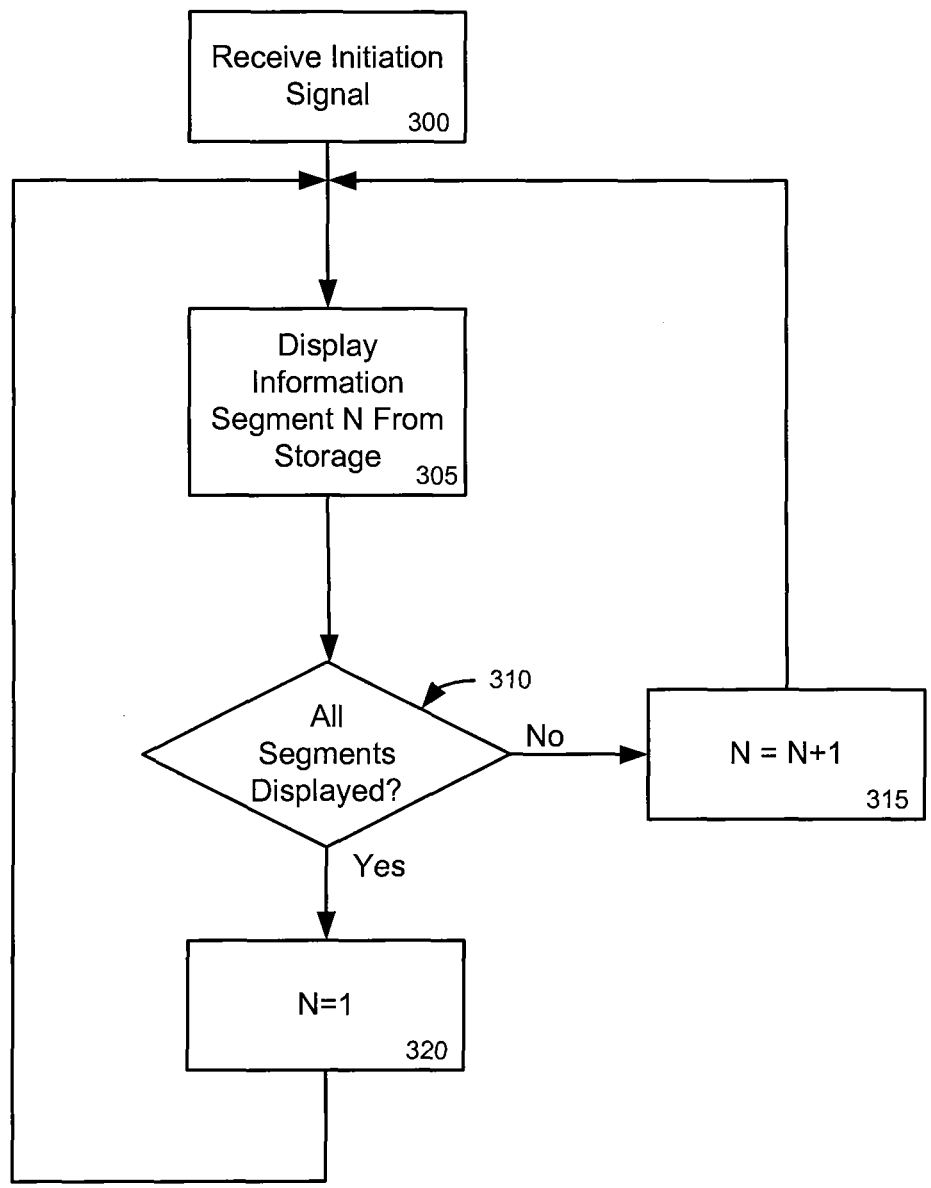
FIG. 3 is a flowchart for retrieving and presenting interactive information in accordance with the exemplary embodiment of the present invention.

FIG. 3 depicts an exemplary method for retrieving and presenting interactive information in accordance with the exemplary embodiment of the present invention. First, in operation 300, the embodiment receives a signal to initiate display of one or more segments. Various initiation signals are discussed above.

In operation 305, the embodiment displays segment N, which is retrieved from storage. The first time operation 305 is executed, the retrieved segment is segment 1. It should be noted that the number of the segment, as used in operations 305-320, may be assigned in a variety of manners. For example, segments may have their number incremented as they are received and/or stored, such that the first received (or stored) segment is segment 1. Alternatively, segments may be sorted alphanumerically by name or identifier. As yet another alternative, the embodiment may include a weighting or relevancy function, such that segments more relevant or containing more data/information related to the search criteria are assigned lower numbers. Weighting and/or relevancy determination may be based on a factor included in the metadata, such that each metadatum has an accompanying weighting score. As an example, a first segment may include a thirty-second appearance by Angelina Jolie and so have a weighting score of "30" for "Angelina Jolie" metadata. A second segment may include a ten minute interview with Angelina Jolie and so have a weighting score of "600" for "Angelina Jolie" metadata. (The exact numbers of the weighting scores are arbitrary, so long as the rankings are maintained. For example, the weighting scores may increase geometrically or logarithmically or may not be tied to time at all.) Thus, in the exemplary embodiment, the "600" score segment may be segment 1 while the "30" score segment may be segment 2. Alternative ways to sort and assign rankings to segments will occur to those of ordinary skill in the art.

In operation 310, the embodiment determines if all segments stored on the storage device 125 have been displayed on the display 130. If not, the segment number is incremented by 1 in operation 315 and then operation 305 is again accessed to display the next segment.

If all segments have been displayed, then operation 320 is executed. In operation 320, N may be reset to 1 so that the first segment is again displayed in operation 305. In this manner, the segments may be repeatedly displayed in a loop.

Alternatively, after display of the final segment, the embodiment may stop retrieving and displaying segments altogether.

It should be noted that the flowcharts of FIGS. 2 and 3 are illustrative only. Alternative embodiments of the present invention may add operations, omit operations, or change the order of operations without affecting the spirit or scope of the present invention.

It should also be noted that various segments may be displayed in a list, folder, or menu item to a user in order to allow the user to pick only those segments he desires to watch.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for storing a data segment, comprising:
receiving a data stream from a service provider at a client receiver, wherein the data stream contains a program having at least a first data segment and a second data segment;
receiving a first metadata from the service provider at the client receiver, the first metadata describing at least one attribute of the data stream;
receiving a second metadata from the service provider at the client receiver, the second metadata describing at least one attribute of the first data segment;
determining, by the client receiver, if the second metadata matches a search criterion, wherein the search criterion is provided by a user; and
in the event that the second metadata matches the search criterion, storing the first data segment at the client receiver as the first data segment is received from the service provider, and not storing the second data segment.

2. The method of claim 1 wherein the first and second metadata is received concurrently with the data segment.

3. The method of claim 2 wherein the storing operation further comprises:
beginning the storing of the first data segment when it is determined that the second metadata matches the search criterion; and
terminating the storing of the first data segment when new metadata is received that no longer matches the search criterion.

4. The method of claim 1 wherein the first and second metadata are received prior to receiving the audiovisual program.

5. The method of claim 4 wherein the second metadata includes a start time and a stop time of the first data segment; the storing operation further comprising:
beginning the storing of the first data segment based on the start time; and
terminating the storing of the first data segment based on the stop time.

6. A method for storing a segment of an audiovisual program, comprising:
receiving metadata at a client receiver from a service provider, the metadata describing at least one attribute of the audiovisual program, the metadata including at least one attribute of at least a first segment of the program and a second data segment of the program;
receiving a search criterion from a user;
determining if the search criterion matches the metadata of the first segment of the program; and
in the event the search criterion matches the at least one attribute of the first segment of the program, setting a timer to store the first segment when the audiovisual program is received at the client receiver from the service provider, and not setting a timer to store the second segment.

7. The method of claim 6 wherein the metadata is received concurrently with the first segment of the program.

8. The method of claim 7 wherein the setting the timer operation further comprises:
beginning the timer when it is determined that the metadata matches the search criterion; and
terminating the timer when new metadata is received that no longer matches the search criterion.

9. The method of claim 7 wherein the setting the timer operation further comprises:
beginning the timer when it is determined that the metadata matches the search criterion; and
terminating the timer after a set period of time.

10. The method of claim 6 wherein the metadata is received prior to receiving the program.

11. The method of claim 10 wherein the metadata includes a start time and a stop time of the first segment of the program.

12. The method of claim 11 wherein the setting the timer operation further comprises:
beginning the timer based on the start time; and
terminating the timer based on the stop time.

13. The method of claim 6 further comprising:
displaying the first segment of the program to the user.

14. The method of claim 13 wherein the displaying the first segment of the program further comprises:
providing a set of criteria for ranking a plurality of stored segments; and
displaying the segments based upon the ranking of the plurality of stored segments.

15. A system for storing a segment of an audiovisual program, comprising:
a transmitter;
a storage device; and
a receiver, wherein the receiver is configured to:
receive metadata describing at least one attribute of the audiovisual program from the transmitter, the metadata including at least one attribute of a first segment of the program and one attribute of a second segment of the program;

receive a search criterion from a user;

receive the audiovisual program from the transmitter;

determine if the search criterion matches the metadata of the first segment of the program; and in the event the search criterion matches the at least one attribute of the first segment of the program, set a timer to store the first segment of the program in the storage device when the audiovisual program is received from the transmitter, and not set a timer to store the second segment of the program.

16. The system of claim 15 wherein the receiver is further configured to:

begin the timer when it is determined that the metadata matches the search criterion; and terminate the timer when new metadata is received that no longer matches the search criterion.

17. The system of claim 15 wherein the receiver is further configured to:

begin the timer when it is determined that the metadata matches the search criterion; and terminate the timer after a set period of time.

18. The system of claim 15 wherein the metadata includes a start time and a stop time of the first segment of the program and the receiver is further configured to:

begin the timer based on the start time; and terminate the timer based on the stop time.

19. The system of claim 15 further comprising;

a display device for displaying the stored segment to the user.

20. The system of claim 19 wherein the storage device is further configured to:

provide a ranking to each stored segment.

21. The system of claim 20 wherein the display device is configured to:

provide a customized channel for display of the stored segments; and display the stored segments on the customized channel based on the ranking of each stored segment.

22. A method for storing a segment of an audiovisual program, comprising:

providing an audiovisual program from a service provider to a client receiver, wherein the audiovisual program contains at least a first and second segment of the program; and providing metadata from the service provider to the client receiver, the metadata describing at least one attribute of the audiovisual program, the metadata including at least one attribute of the first segment of the program and one attribute of the second segment of the program;

wherein the metadata is compared, at the client receiver, to a search criterion provided by a user and, in the event that the metadata for the first segment matches the search criterion, a timer is set to store the first segment of the program when the audiovisual program is received from the service provider, and not set to store the second segment.

* * * * *